United States Patent
Garrity et al.

(10) Patent No.: US 10,942,697 B2
(45) Date of Patent: Mar. 9, 2021

(54) SYSTEM FOR DISCOVERING CONFIGURATION OF DISPLAY WALL

(71) Applicant: SPRINKLR, INC., New York, NY (US)

(72) Inventors: Justin Garrity, Portland, OR (US); Dan Blaisdell, Hillsboro, OR (US); Ryan Parr, North Plains, OR (US)

(73) Assignee: SPRINKLR, INC., New York, NY (US)

( * ) Notice: Subject to any disclaimer, the term of this patent is extended or adjusted under 35 U.S.C. 154(b) by 157 days.

(21) Appl. No.: 15/906,739

(22) Filed: Feb. 27, 2018

(65) Prior Publication Data

US 2018/0260185 A1  Sep. 13, 2018

Related U.S. Application Data

(60) Provisional application No. 62/468,247, filed on Mar. 7, 2017.

(51) Int. Cl.
*G06F 17/00* (2019.01)
*G06F 3/14* (2006.01)
(Continued)

(52) U.S. Cl.
CPC .......... *G06F 3/1446* (2013.01); *G06F 3/1423* (2013.01); *G06F 3/1454* (2013.01);
(Continued)

(58) Field of Classification Search
CPC .... G06F 3/1446; G06F 3/1423; G06F 3/1454; G06F 40/106; G06F 17/212
(Continued)

(56) References Cited

U.S. PATENT DOCUMENTS 9,201,955 B1  12/2015  Quintao
2001/0028369 A1*  10/2001  Gallo ................... G06F 3/04815
715/848
(Continued)

FOREIGN PATENT DOCUMENTS

WO  2016/118425 A1  7/2016

OTHER PUBLICATIONS

McIntyre et al., Support for Multitasking and Background Awareness Using Interactive Peripheral Displays, ACM 2001, pp. 41-50. (Year: 2001).*

(Continued)

*Primary Examiner* — Cong-Lac Huynh
(74) *Attorney, Agent, or Firm* — Schwabe Williamson & Wyatt

(57) ABSTRACT

A display server automatically determines layouts of display walls. The display server receives one or more setup messages from a display wall and assigns one or more universal resource locators (URLs) to one or more display screens in the display wall based on the setup messages. The display server sends one or more webpages including different patterns to display on the display screens in the display wall and receives back display information showing the patterns displayed on the display screens. The display server then generates a configuration file identifying an arrangement of display regions in the display wall based on the display information. The display server also may operate a content manager that accesses the configuration file to identify the layouts for the different display walls and identify storyboards with similar layouts.

19 Claims, 9 Drawing Sheets

(51) Int. Cl.
*G06F 40/106* (2020.01)
*G06F 3/0482* (2013.01)
*H04L 29/08* (2006.01)

(52) U.S. Cl.
CPC .......... *G06F 40/106* (2020.01); *G06F 3/0482* (2013.01); *G09G 2340/0464* (2013.01); *G09G 2340/14* (2013.01); *G09G 2370/022* (2013.01); *G09G 2370/16* (2013.01); *H04L 67/02* (2013.01)

(58) Field of Classification Search
USPC .......................................................... 715/229
See application file for complete search history.

(56) References Cited

U.S. PATENT DOCUMENTS

| | | | |
|---|---|---|---|
| 2003/0187956 A1* | 10/2003 | Belt | H04L 67/2823 709/219 |
| 2003/0220835 A1 | 11/2003 | Barnes, Jr. | |
| 2004/0054819 A1 | 3/2004 | Daimoto et al. | |
| 2005/0050021 A1* | 3/2005 | Timmons | G06F 16/957 |
| 2005/0131909 A1 | 6/2005 | Cavagnaro et al. | |
| 2006/0184963 A1* | 8/2006 | Snijder | H04N 21/26603 725/37 |
| 2007/0103583 A1* | 5/2007 | Burnett | H04N 9/3147 348/383 |
| 2008/0284910 A1* | 11/2008 | Erskine | G11B 27/11 348/468 |
| 2011/0004827 A1* | 1/2011 | Doerr | H04L 67/36 715/735 |
| 2011/0098108 A1* | 4/2011 | Kuper | A63F 13/60 463/29 |
| 2011/0122155 A1* | 5/2011 | Zechlin | G06F 16/9577 345/660 |
| 2011/0255748 A1* | 10/2011 | Komoto | G06T 7/246 382/103 |
| 2011/0307312 A1 | 12/2011 | Goeldi | |
| 2011/0320948 A1* | 12/2011 | Choi | H04N 9/12 715/719 |
| 2012/0110427 A1* | 5/2012 | Krause | G06F 16/957 715/208 |
| 2012/0134536 A1* | 5/2012 | Myokan | G06K 9/00993 382/103 |
| 2012/0291059 A1 | 11/2012 | Roberts | |
| 2013/0124653 A1 | 5/2013 | Vick | |
| 2013/0166379 A1 | 6/2013 | Ehindero | |
| 2013/0297581 A1 | 11/2013 | Ghosh | |
| 2013/0297694 A1 | 11/2013 | Ghosh | |
| 2014/0040029 A1 | 2/2014 | Vhora | |
| 2014/0156341 A1 | 6/2014 | Kruk | |
| 2014/0222578 A1 | 8/2014 | Poornachandran | |
| 2014/0232616 A1 | 8/2014 | Drake | |
| 2014/0280052 A1 | 9/2014 | Alonso et al. | |
| 2014/0361954 A1* | 12/2014 | Epstein | H04M 7/0027 345/2.3 |
| 2015/0019335 A1 | 1/2015 | Zhou | |
| 2015/0031389 A1* | 1/2015 | Liu | H04W 64/006 455/456.1 |
| 2015/0046269 A1 | 2/2015 | Liu | |
| 2015/0046781 A1 | 2/2015 | Baker | |
| 2015/0088622 A1 | 3/2015 | Ganschow | |
| 2015/0089429 A1 | 3/2015 | Ghassabian | |
| 2015/0112814 A1 | 4/2015 | Stokes | |
| 2015/0161633 A1 | 6/2015 | Adams | |
| 2015/0187333 A1* | 7/2015 | Loeffler | G09G 5/04 345/1.3 |
| 2015/0213119 A1 | 7/2015 | Agarwal | |
| 2015/0235239 A1 | 8/2015 | Chowdhary | |
| 2015/0279037 A1* | 10/2015 | Griffin | G09G 5/006 345/1.3 |
| 2016/0140627 A1 | 5/2016 | Moreau | |
| 2016/0155389 A1* | 6/2016 | Beon | G06F 3/1446 345/690 |
| 2016/0217408 A1 | 7/2016 | Garrity | |
| 2016/0225017 A1 | 8/2016 | Wong | |
| 2016/0343040 A1 | 11/2016 | Garrity | |
| 2017/0061469 A1 | 3/2017 | Garrity | |
| 2017/0084246 A1* | 3/2017 | Joshi | G09G 3/32 |
| 2019/0026788 A1 | 1/2019 | Garrity | |
| 2019/0094027 A1* | 3/2019 | Xu | G05D 1/028 |
| 2019/0102075 A1* | 4/2019 | Naidoo | G05B 19/41835 |
| 2019/0265942 A1* | 8/2019 | Yoshimura | G06F 3/1462 |
| 2020/0226526 A1 | 7/2020 | Garrity | |
| 2020/0250395 A1* | 8/2020 | Ross | G06K 9/6215 |
| 2020/0293258 A1* | 9/2020 | Lin | G09G 5/38 |

OTHER PUBLICATIONS

Krishnaprasad et al., JuxtaView—A Tool for Interactive Visualization of Large Imagery on Scalable Tiled Displays, IEEE 2004, pp. 411-420. (Year: 2004).*

Yamaoka et al., Visualization of High-Resolution Image Collections on Large Tiled Display Wall, Elsevier 2011, pp. 498-505. (Year: 2011).*

Gruhl, et al., "Multimodal social intelligence in a real-time dashboard system", VLDB Journal 19.6: 825-848; Springer New York; Jan. 1, 2010.

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet: <URL: https://en.wikipedia.org/w/index.php?title=Server_(computing)&oldid=643171056> retrieved on Mar. 14, 2016; 7 pages.

* cited by examiner

| 54A | 54B | 54C | 54D | 54E | 54F | 54G |
|---|---|---|---|---|---|---|
| DISPLAY SCREEN | LAYOUT | RESOLUTION | ASPECT RATIO/ ORIENTATION | BROWSER/ OS | BEZEL SPACING | LOCATION |
| URL 1 | 2 X 2 UPPER LEFT | 1920 X 1080 | LANDSCAPE | CHROME V35 / MAC OSX 10.11 | 1 INCH X 1 INCH | COUNTRY CITY ADDRESS FLOOR ROOM |
| URL 2 | 2 X 2 UPPER RIGHT | 1920 X 1080 | LANDSCAPE | CHROME V35 / MAC OSX 10.11 | 1 INCH X 1 INCH | |
| URL 3 | 2 X 2 LOWER LEFT | 1920 X 1080 | LANDSCAPE | CHROME V35 / MAC OSX 10.11 | 1 INCH X 1 INCH | |
| URL 4 | 2 X 2 LOWER RIGHT | 1920 X 1080 | LANDSCAPE | CHROME V35 / MAC OSX 10.11 | 1 INCH X 1 INCH | |

DISPLAY WALL CONFIGURATION FILE 15

FIGURE 6

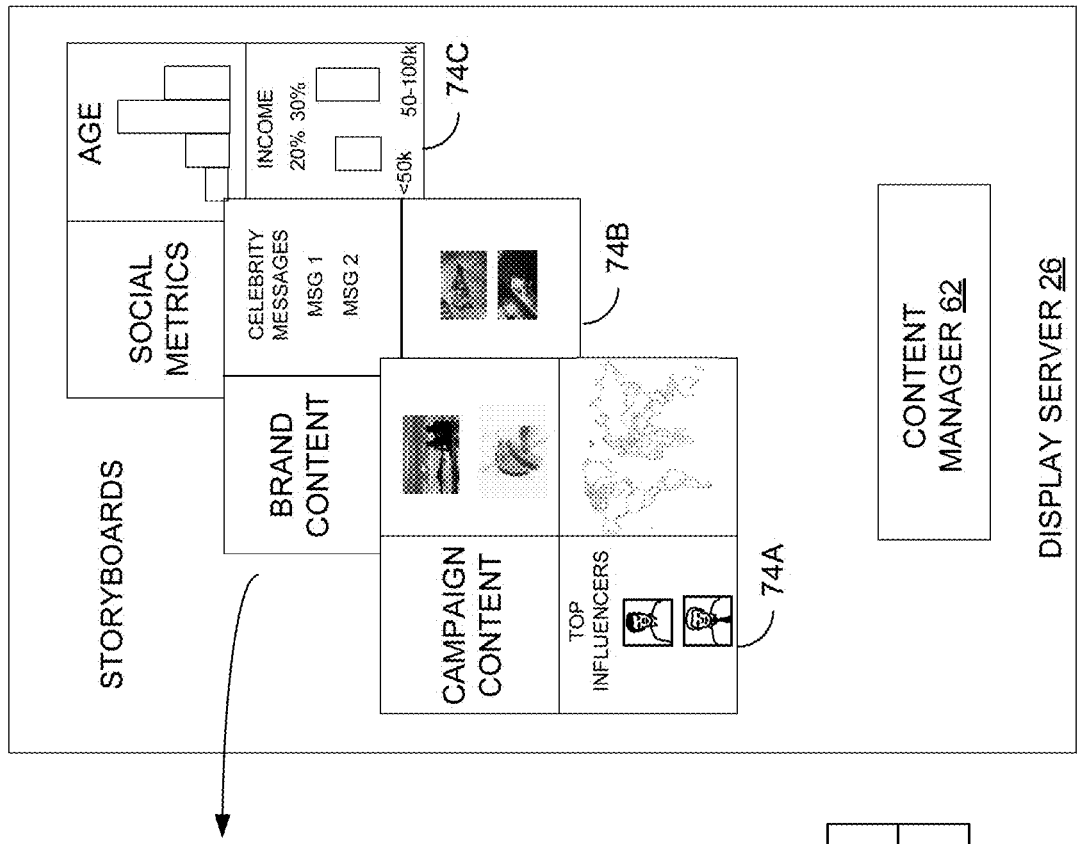
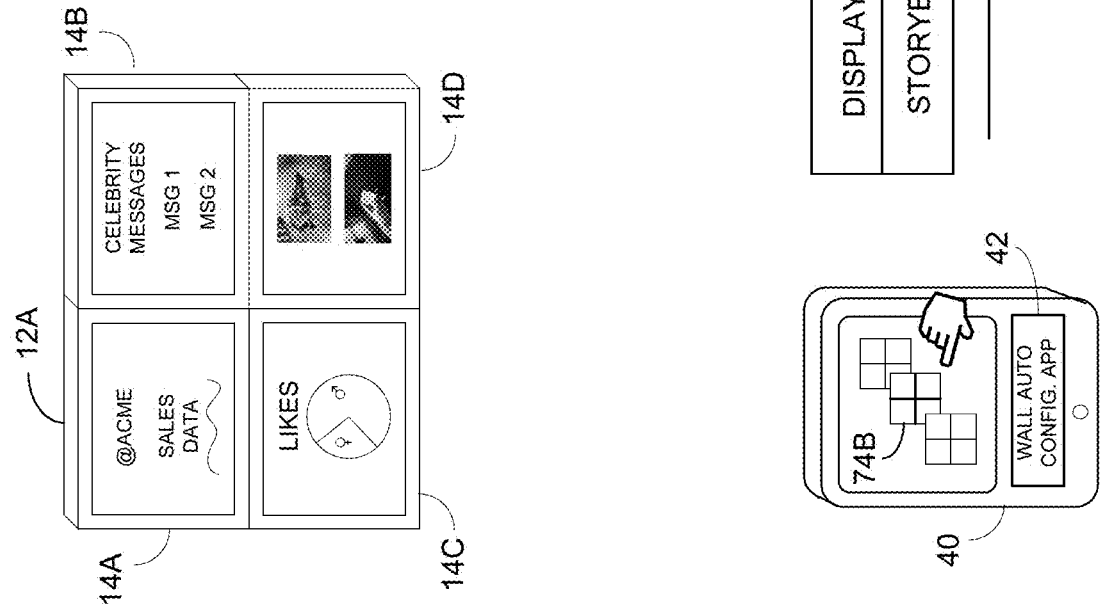
FIGURE 8

SYSTEM FOR DISCOVERING CONFIGURATION OF DISPLAY WALL

The present application claims priority to U.S. Provisional Patent Application Ser. No. 62/468,247 filed Mar. 7, 2017, Entitled: SYSTEM FOR DISCOVERING CONFIGURATION OF DISPLAY WALL, which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a system for discovering the configuration of a display wall.

BACKGROUND

A company may use an array of display screens to display different types of data in the office or venue like a booth, concert hall, stadium, etc. The screens may display a variety of data, including static and dynamic data. Different display screen locations may have different display arrangement configurations. For example, a first room may have four display screens arranged in a 2×2 configuration and a second outdoor location may have six display screens arranged in a single 6×1 row.

A producer will need to determine the display screen arrangement for each location. For example, the producer may ask someone at the remote location to identify the number, size, and arrangement of display screens in the display wall as well as which computer is connected to each display. The producer then generates URLs (webpages) that display content on the different display screens. The same process is repeated for each different display location. Manually discovering display screen layouts is time consuming and the persons at the display screen locations often don't know specific information regarding screen sizes, resolution, or software used for displaying the content.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 6 shows an example display wall configuration table.

FIG. 8 is an example remote control system for displaying storyboards on a display wall.

DETAILED DESCRIPTION

A display server automatically generates a configuration file for a display wall. The configuration file identifies the geographic location, machine and browser specifications, resolution, and layout of the display wall. The display server automatically assigns uniform resource locators (URLs) and associated webpages to each identified screen in the display wall. A content manager uses the configuration file to help assign content to display walls.

Figure 1:
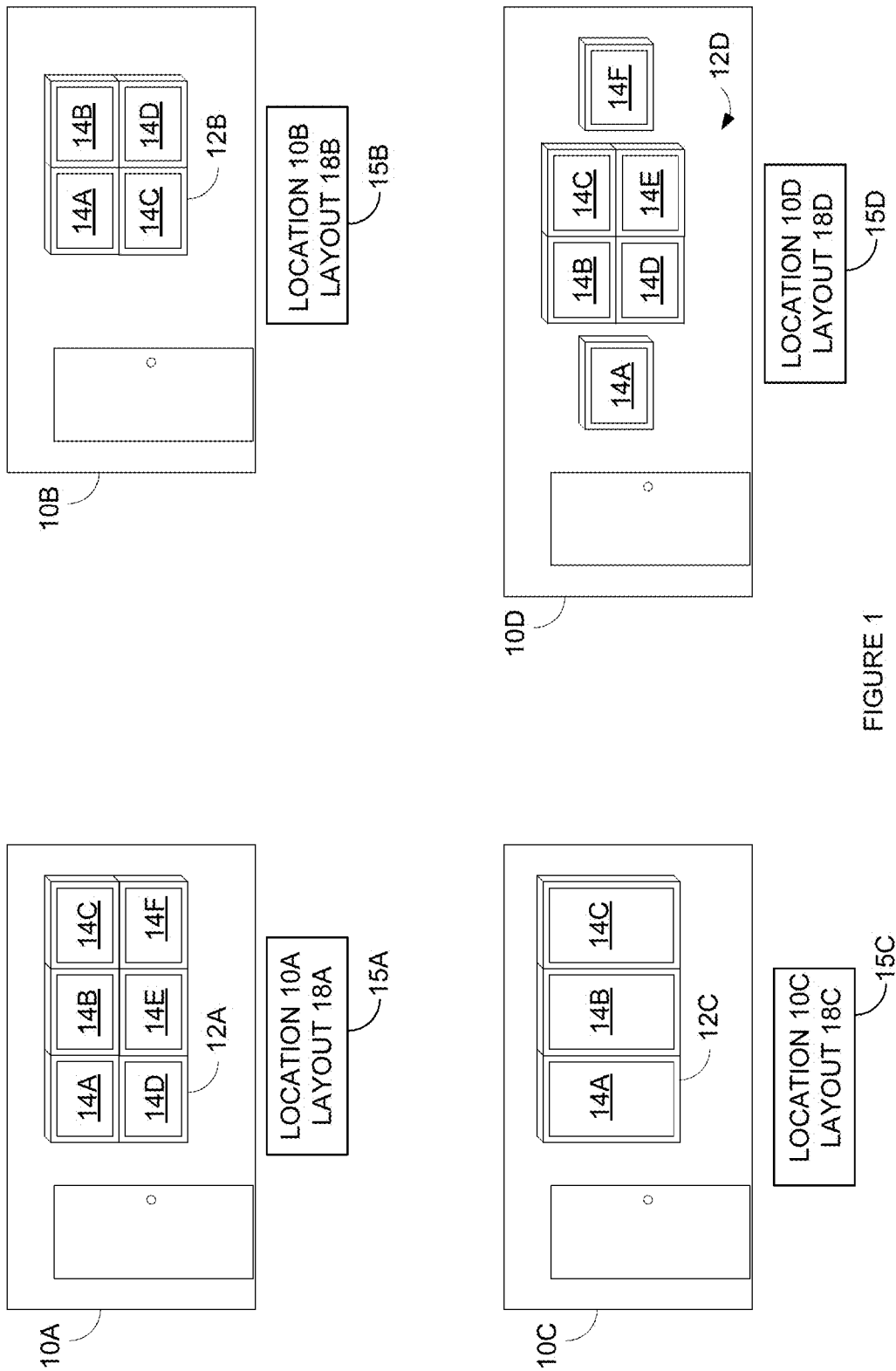
FIG. 1 shows example display wall configurations.

FIG. 1 shows examples of different display wall configurations at different geographical locations. A first display wall 12A at location 10A may include six different display screens 14A-14F arranged in a 3×2 configuration with three display screens 14A-14C in a first row and three display screens 14D-14F located in a second row. A second display wall 12B at location 10B may include four different display screens 14A-14D arranged in a 2×2 configuration with two display screens 14A and 14B in a first row and two display screens 14C and 14D in a second row.

A third display wall 12C at location 10C may include three different display screens 14A-14C arranged in a 3×1 configuration with three display screens 14A-14C in a single row. A fourth display wall 12D at location 10D may include six different display screens 14A-14F arranged in a winged configuration with a left display screen 14A, a 2×2 configuration of display screens 14B-14E, and a right display screen 14F.

A display server automatically generates at least some portions of configuration files 15 that identify the locations 10 and layouts 18 for display walls 12. For example, configuration file 15A may identify a location 10A for display wall 12A as 360 SW River Rd, Suite 20, Los Angeles, Calif. Configuration file 15B may identify a location 10B for display wall 12B in the same building as display wall 12A but on a different floor and/or in a different room. Configuration file 15C may identify a location of display wall 12C as a building address and room number in New York City.

Configuration files 15A-15D also may identify the layouts 18 for each associated display wall 12. For example, configuration file 15A may include a layout 18A that identifies display wall 12A as having the 3×2 configuration and also identifies relative positions of each display screen 14A-14F. For example, layout 18A may identify display screen 14A located in an upper left position, display screen 14B located in an upper middle position, display screen 14C located in an upper right position, display screen 14D located in a lower left position, display screen 14E located in a lower middle position, and display screen 14F located in a lower right position.

Configuration Discovery

Figure 2:
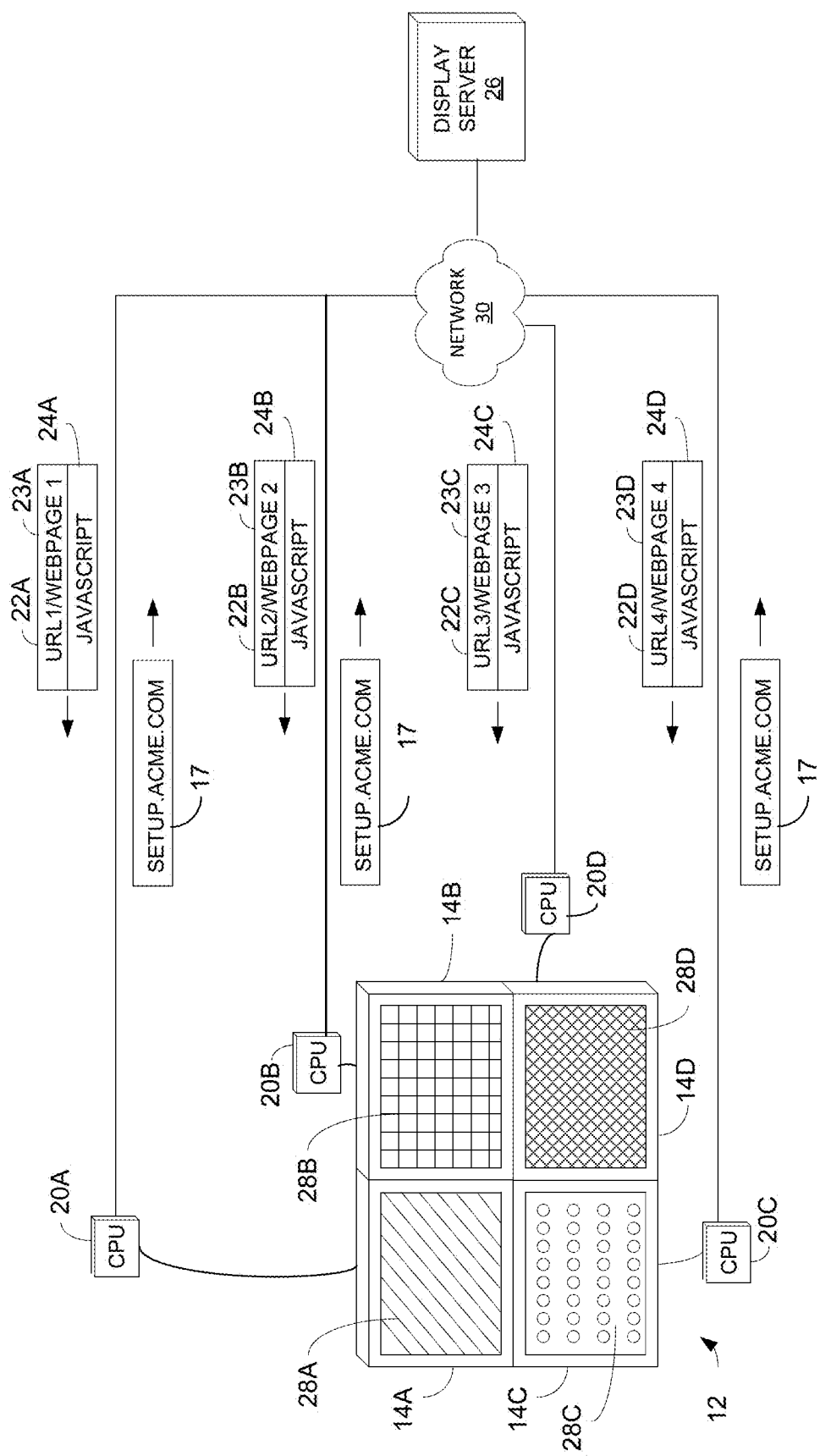
FIG. 2 shows example patterns displayed on different screens of a display wall.

FIG. 2 shows one example of how a display server automatically determines the layout of a display wall. Each display screen 14 may include a central processing unit (CPU) 20 that operates a web browser and connects to display server 26 via network 30. Network 30 may be any combination of local area network (LAN), wide area network (WAN), cellular network, wireless network (WIFI) referred to generally as the Internet.

An operator at display wall 12 may enter a same generic setup URL 17 into the web browser operating on each display screen 14. In response to receiving URLs 17, display server 26 automatically generates unique URLs 22A-22D for display screens 14A-14D, respectively. For example, display server 26 may generate a first unique URL 22A in response to receiving setup URL 17 from the web browser on display screen 14A. Display server 26 may generate a second unique URL 22B in response to receiving setup URL 17 from the web browser on display screen 14B, etc.

Display server 26 then automatically generates a webpage 23 with a different pattern 28 for each URL 22. For example, display server 26 generates random patterns 28A-28D on webpages 23A-23D stored in URLs 22A-22D, respectively. Display server 26 downloads webpages 23A-23D and associated patterns 28A-28D to the associated display screens 14A-14D, respectively. Each webpage 23 may include additional JavaScript 24 for performing different operations described below.

Figure 3:
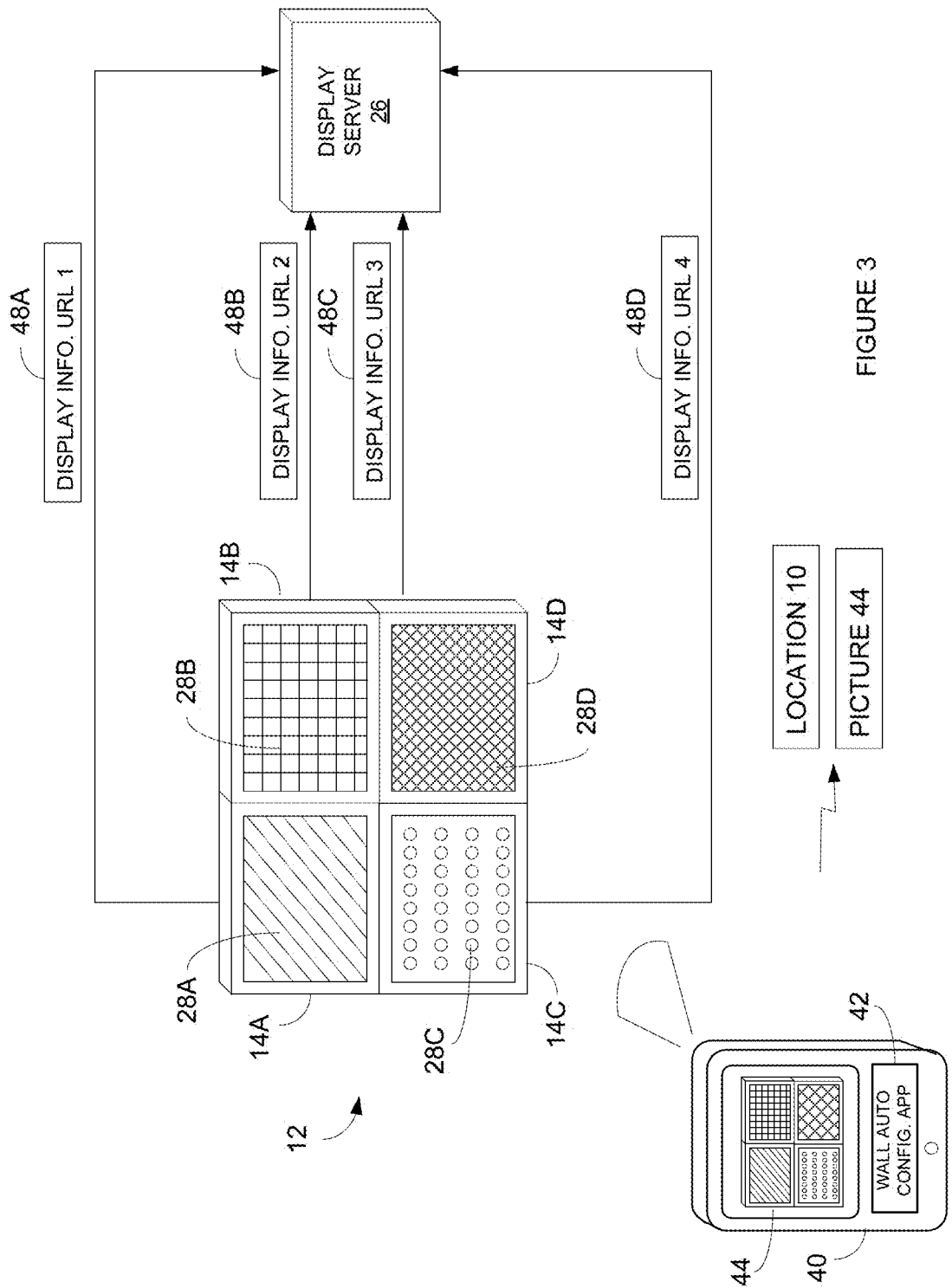
FIG. 3 shows an example system for determining a display wall configuration.

FIG. 3 shows an example of system for capturing and transmitting configuration information for display wall 12 to a display server. In one example, a device 40 may take a picture 44 of display wall 12 and transmit the picture 44 back to display server 26. Device 40 may be any computing element that can take a picture and transmit the picture 44 to display server 26, such as a smart phone, camera, personal computer, laptop, tablet, or the like, or any combination thereof.

Referring to FIGS. 2 and 3, device 40 may include an application 42 that directs a user to enter generic set-up URL 17 into the web browsers operating on each display screen 14. Application 42 also may prompt the user to enter a name and geographic location 10 into device 40 that provides a unique identifier for display wall 12. For example, the user may enter a building address and a particular floor or office within the building. The user may enter any other text description that operates as a unique identifier for display wall 12, such as an inside or outside location, longitude and latitude information, etc.

In another example, device 40 may automatically determine the location/address 10 of display panel 12 based on any combination of global positioning system (GPS) data, wireless router data, electronic maps, WIFI location data, cellular communication tower data, altimeter data, etc. Device 40 may send location data 10 to display server 26.

Application 42 also may prompt the user to take a picture 44 of display wall 12 and send the picture 44 to display server 26. Display server 26 may use picture 44 to discover configuration information about display wall 12. For example, display server 26 may identify the four different patterns 28A-28D as associated with four different display screens 14A-14D, respectively. Display server 26 also may use picture 44 to determine a resolution, aspect ratio, and/or orientation of each display screen 14. Display server 26 also may use picture 44 to determine a bezel size or spacing between each display screen 14.

JavaScript 24A-24D in webpages 23A-23D, respectively, may transmit additional configuration information 48 to display server 26. For example, JavaScript 24 may identify an operating system and browser type and version running on display screens 14. JavaScript 24 also may determine a resolution and other physical features of display screens 14 not provided via picture 44. For example, JavaScript 24 may identify the display screen information by reading configuration files stored in display screens 14.

In some examples, display wall 12 may tile together multiple display screens 14 into a virtual canvas where different portions of the same web page 23 are displayed on display screens 14. Display server 26 may only receive a single setup URL 17 from location 10 and only generate a single URL 22 for the single setup URL 17. Display server 26 may identify a tiled display wall 12 by identifying different portions of the same pattern 28 spaced apart by display screen bezels.

Figure 4:
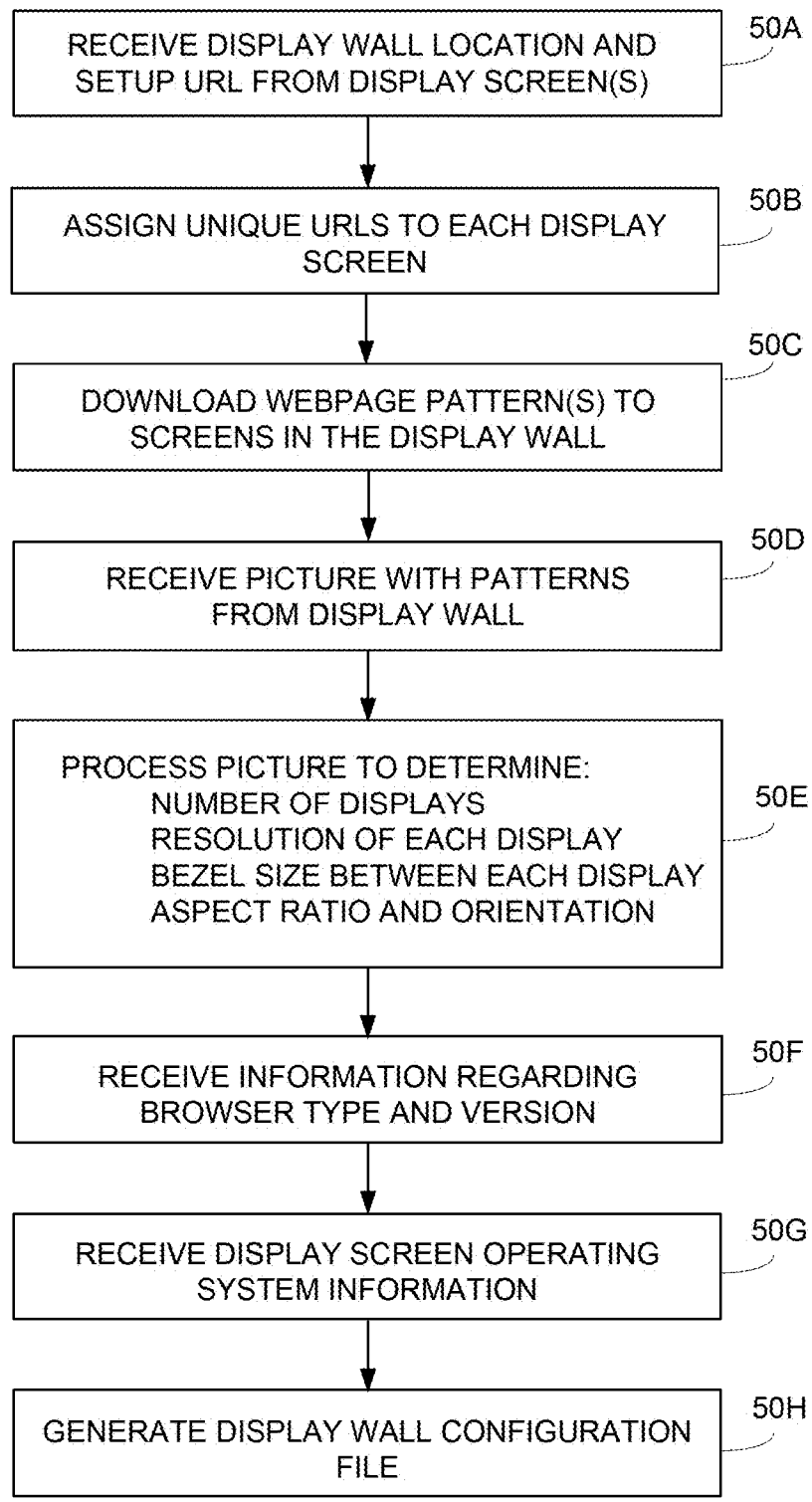
FIG. 4 shows an example process for determining a display wall configuration.

FIG. 4 shows an example process for automatically generating a display wall configuration file. In operation 50A, the display server receives display wall location information. For example, a user may enter a building address and room number into software application 42. Application 42 then sends the location information to the display server. In operation 50A, the display server also receives the setup URLs from the different display screen web browsers. For example, application 42 may prompt the user to enter a generic setup URL into each display screen web browser.

In operation 50B, the display server may generate unique URLs for each received setup URL. For example, under a directory associated with the display wall location, the display server may generate different URL files for each display screen. In operation 50C, the display server may automatically select random patterns and load the patterns into webpages for the different generated URLs. The webpages are downloaded and displayed on the different screens in the display wall.

In operation 50D, display server 26 receives a picture of the display wall from device 40. For example, application 42 prompts the user to take a picture of display wall 12. Application 42 then sends the picture to application server 26.

In operation 50E, display server 26 processes the picture to derive different display wall configuration information. For example, display server 26 may determine the number and position of display screens, resolution of each display screen, a space or bezel size between each display screen, and the aspect ratio and orientation of each display screen 14.

In operation 50F, display server 26 may receive browser information either from device 40 or from JavaScript 24 in the downloaded webpages. For example, JavaScript 24 may identify the browser type and version used by the display screen 14 from web browser configuration data, or a user may manually enter the browser information into application 42.

In operation 50G, display server 26 may receive information either from device 40 or from JavaScript 24 identifying an operating system used by each display screen 14. For example, JavaScript 24 may read a configuration file stored in display screen 14 that identifies the operating system type and version. Alternatively, the user could manually enter the operating system information into application 42.

In operation 50H, display server 26 generates a display wall configuration file from the received information. The configuration file may identify the geographic location of display wall 12, identify the layout of display wall 12, identify locations of individual display screens 14 in display wall 12, and identify the automatically generated URLs for each display screen in display wall 12. The configuration file links display wall 12, and each display screen 14 in display wall 12, to a specific location and display wall layout. The configuration file is described in more detail below.

Figure 5:
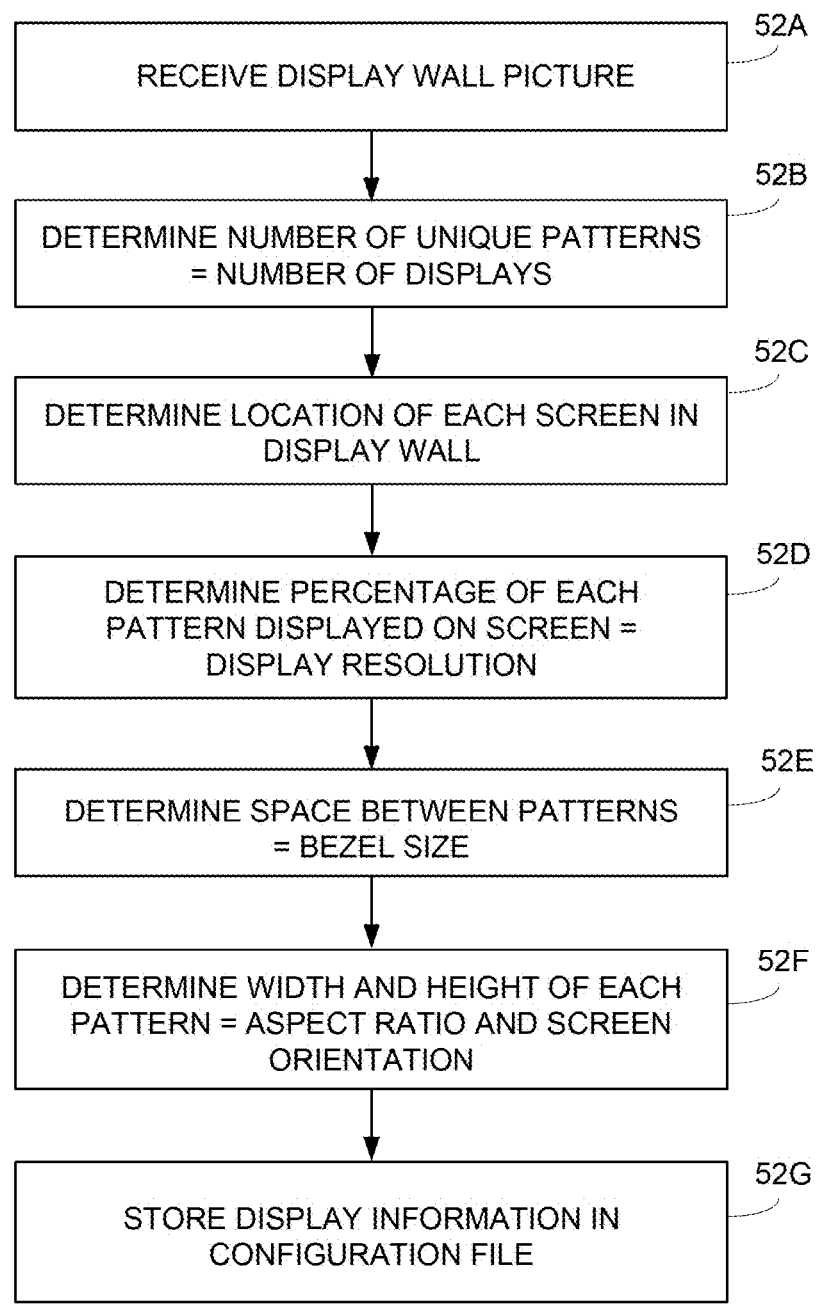
FIG. 5 shows an example process for determining display screen information based on a display wall picture.

FIG. 5 shows an example of how display server 26 generates display wall configuration information from a display wall picture. In operation 52A, display server 26 receives the picture showing the patterns displayed by display wall 12. In operation 52B, display server 26 detects the number of unique patterns in the picture. Each unique pattern may correspond to a different display screen 14. In another example, a display wall may tile a single webpage pattern over multiple display screens 14. Display server 26 may identify the number of display screens 14 by identifying spaces or breaks in the displayed pattern.

Operation 52C may determine the relative location of each screen 14 in display wall 12. For example, display server 26 may first determine display wall 12 has three columns and two rows (3×2). A display screen in the upper row farthest to the left may be identified as the first display screen or as the upper left display screen. A second middle display screen in the upper row may be referred to as the second display screen or the upper middle display screen, etc.

Operation 52D may determine the resolution of each display screen. For example, the display server may determine the resolution based on a percentage of the pattern displayed on the display screen picture. Operation 52E may determine the bezel size or spacing between the display screens. For example, display server 26 may calculate the distance between the edges of the horizontally adjacent patterns and distance between the vertically adjacent patterns in the picture.

Operation 52F may determine the aspect ratio and orientation of each display screen 14. For example, display server 26 may measure the width and height of each pattern 28 in the picture and calculate an associated screen aspect ratio and determine the screen landscape or portrait orientation. Operation 52G then stores the display information in the display wall configuration file. The configuration file may link the layout and display information for each display screen to the URL previously generated for that display screen.

As explained above, display server 26 may only transmit one pattern to display wall 12 when only one processor operates all of the tiled display screens. Display server 26 determines a percentage of the one pattern used in each display screen 14 and measures any gaps between the displayed portions of the pattern to determine the number, position, resolution, bezel size, etc. for each display screen 14. In another example, application 42 in device 40 may calculate the display wall information described above in operations 52 and transmit the calculated configuration information to display server 26 for storage in the associated configuration file.

FIG. 6 shows an example configuration file automatically generated for a display wall. A column 54A may identify the URLs automatically generated by the display server for each screen in the display wall. For example, the display server may generate a set of four unique URLs under a directory created for the display screen for each identified display screen. Column 54B may identify the layout for the display wall and the location of the screens within the display wall layout. For example, the display server may discover the display wall has a 2×2 layout and determine that the display screen assigned URL1 is located in the upper left corner of the 2×2 layout.

Column 54C may identify the resolution determined for each display screen and column 54D may identify the aspect ratio and orientation determined for each display screen. Column 54E may identify the type of web browser and operating system used by each display screen. Column 54F may identify the bezel size or spacing between each adjacent display screen. Column 54G may contain the unique location information for the display wall. As mentioned above, the location information may identify a specific geographical location of the display wall. It should also be noted that the floor and room information may be manually supplied by a user and then inserted into configuration file 15.

Figure 7:
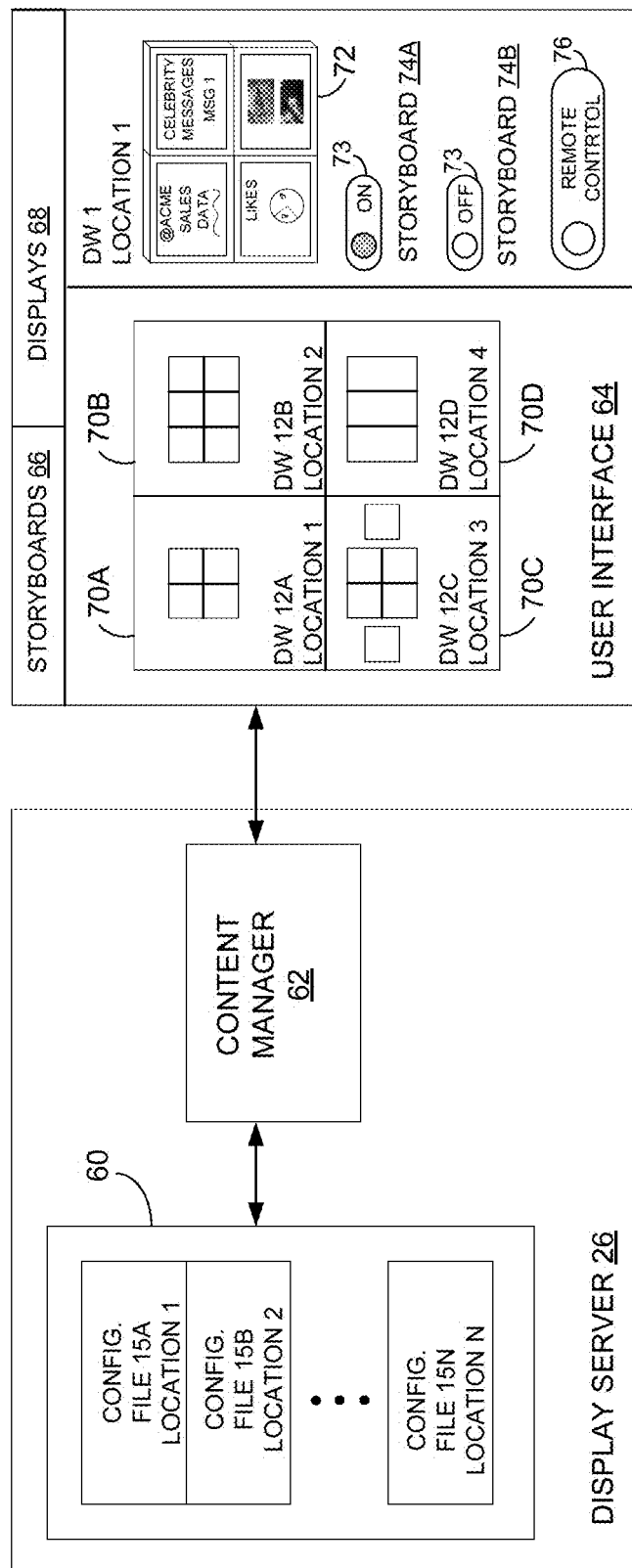
FIG. 7 is an example user interface that displays information from the configuration table in FIG. 6.

FIG. 7 shows one example of how display wall configuration files are used by a content manager. As mentioned above, display server 26 may automatically generate and store configuration files 15A-15N for different display walls in memory 60.

A content manager 62 may operate in display server 26 and access configuration files 15 stored in memory 60. A producer may use content manager 62 to create content on webpages and assign the webpages to different display walls. One example content manager 62 may include a command center described in co-pending U.S. patent application Ser. No. 14/997,013, filed Jan. 15, 2016 and entitled: MULTI-DIMENSIONAL COMMAND CENTER, which is herein incorporated by reference in its entirety.

The producer may access content manager 62 via a user interface 64. The producer may select display icon 68 to display information 70 identifying the names, locations, and layouts 70 for different design walls associated with configuration files 15. For example, display information 70A from configuration file 15A may identify a design wall name DW1, at a location 1, with a 2×2 layout.

The producer may select links included with display information 70 to view webpages and associated content 72 currently assigned to the selected design wall. An arrangement of content 72 for a display wall layout, such as a 2×2 layout, is alternatively referred to as a storyboard. The producer may select different icons 73 to select different storyboards 74 for assigning to a selected display wall 12. In one example, content manager 62 may identify and display icons 73 for any storyboards 74 that have a same layout as the selected display wall 12. Content manager 62 also may display a remote-control icon 76 allowing a user to remotely assign different storyboards 74 to a display wall 12.

FIG. 8 shows how a user may remotely assign different storyboards to a display wall. The producer may create different storyboards 74 for different display wall layouts. For example, the producer may design storyboards 74A-74C for 2×2 display walls. In the 2×2 display wall example, each storyboard 74 may contain 4 different webpages each including content for a different one of 4 display screens 14A-14D. As explained above, the display server automatically discovers display walls with a 2×2 layout, automatically identified the display screens located in each corner of the 2×2 layout, and automatically generates URLs for each identified display. The producer only needs to generate storyboards 74 for a 2×2 layout and content manager 62 then automatically assigns the webpages in the storyboard 74 to the associated URL in the selected display wall.

Different storyboards 74 may be associated with a different content. For example, storyboard 74A may be associated with a campaign or event promoted by a business, storyboard 74B may be associated with an on-line brand promotion, and storyboard 74C may be associated with social metrics associated with a particular campaign or brand. Of course, these are just examples and storyboards 74 may include any type of content.

Application 42 on device 40 may allow a user to select different display walls 12. As described above in FIG. 7, content manager 62 may include a remote-control icon 76 that allows application 42 to select between different display walls 12 and/or storyboards 74. In response to selecting remote-control icon 76, application 42 may display a version of user interface 64 shown in FIG. 7.

The user of device 40 may select information 70 for an associated display wall 12A. Content manager 62 may determine the layout for selected display wall 12A, such as a 2×2 layout. Content manager 62 then may identify any storyboards 74 associated with the user that have a similar 2×2 layout. Content manager 62 may download images or other identifiers of the identified storyboards 74 to device 40.

The user may select one of the storyboards 74B displayed on device 40. Application 42 sends selected storyboard 74B to content manager 62. Content manager 62 loads the webpages for selected storyboard 74B into the URLs assigned to screens 14A-14D in display wall 12A. Screens 14A-14D in display wall 12A then synchronously change to displaying the brand content contained in the webpages in storyboard 74B.

Display walls 12 or content manager 62 may filter data displayed on screens 14 based on the associated configuration files. For example, a display wall 12A may have an associated configuration file indicating a location in New York. A storyboard 74 assigned to display wall 12A may include content such as posted messages or analytic data. The posted messages and analytic data may include metadata such as location information, zip codes, or user geolocation data.

Display wall 12A or content manager 62 may filter the media streams, analytics, or any other content generated for a selected storyboard 74 based on the display wall location. For example, for display wall 12A located in New York, content manager 62 may only include posted messages and social metrics for the East Coast of the United States. Similarly, a second display wall 12 may have an associated configuration file identifying a location in Los Angeles. Content manager 62 may only include posted messages and social metrics for the West Coast of the United States.

Offline Mode

Some displays may connect to a central server may not be connected to real-time data from the Internet. For example, billboard displays and displays in retail stores often display product videos. These displays typically wait for the central server to periodically download new images.

In one example, display server 26 may store social media, such as user posts, video, or real-time analytic data into image and/or movie files such as moving pictures experts group (MPEG) or joint photographic experts group (JPEG) files. Display server 26 then may load the picture or movie files to a file transfer protocol (FTP) server that sends content to the digital billboard. Real-time social media is then displayed in a non-real time off-line digital billboard.

Hardware and Software

Figure 9:
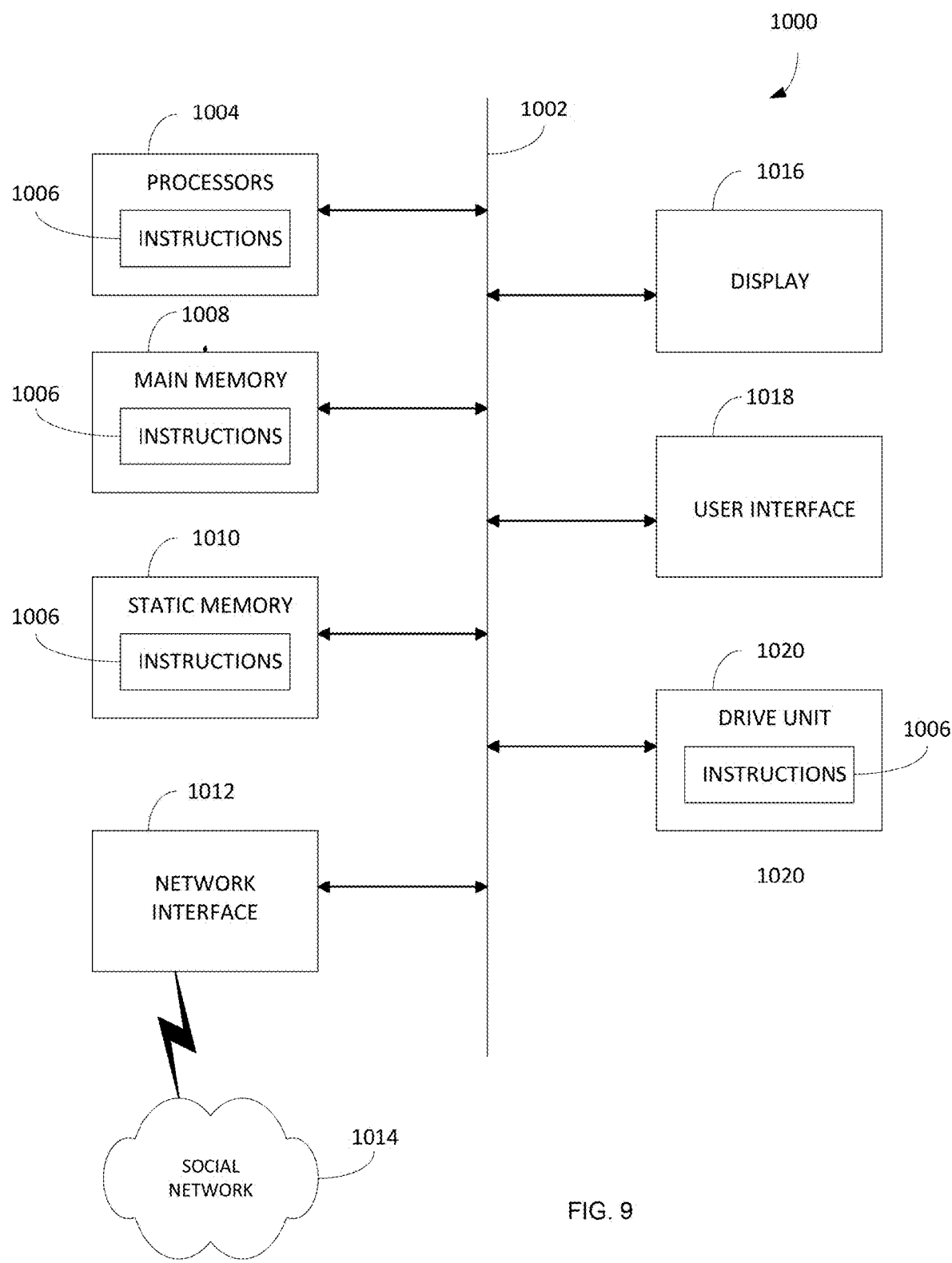
FIG. 9 is an example computer system for discovering display wall configurations.

FIG. 9 shows a computing device 1000 used as device 40 and/or display server 26 and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A server-implemented method for determining display wall layouts, comprising:
   receiving, by a server, one or more setup uniform resource locators (URLs) from a display wall;
   assigning, by the server, one or more URLs to display screens in the display wall based on the one or more setup URLs;
   sending, by the server, different webpages including different patterns to display on the display screens in the display wall;
   discovering, by the server, a layout of the display wall based on display information received following the sending the different webpages, wherein the display information is generated using an image sensor of a remote device and received over a network, the display information showing the different patterns displayed on the display screens; and
   generating a configuration file identifying an arrangement of display regions in the display wall based on the display information.

2. The method of claim 1, wherein the display screens comprise a heterogeneous group of display screens.

3. The method of claim 2, further comprising:
   identifying resolutions of the heterogeneous group of display screens based on the display information;
   identifying bezel sizes between the heterogeneous group of display screens based on the display information;
   identifying orientations and aspect ratios of the heterogeneous group of display screens based on the display information; and
   storing the resolutions, bezel sizes, orientations, and aspect ratios in the configuration file.

4. The method of claim 1, further comprising:
   receiving browser type and version information in the display information; and
   storing the browser type and version information in the configuration file.

5. The method of claim 1, further comprising:
   receiving operating system information in the display information; and
   storing the operating system information in the configuration file.

6. The method of claim 1, further comprising:
   sending JavaScript in the different webpages; and
   receiving at least some of the display information from the JavaScript.

7. The method of claim 1, further comprising:
   receiving information that specifies a location of the display wall in the display information; and
   storing the information that specifies the location in the configuration file.

8. The method of claim 1, further comprising:
   identifying storyboards matching the arrangement of the display wall;
   receiving a user input selecting one of the storyboards; and
   loading webpages for the selected storyboard into the URLs assigned to the display screens in the display wall.

9. A computer system for identifying display information for a display wall, comprising:
   one or more processing devices operable to:
      receive, from a display server, one or more messages that include uniform resource locators (URLs) assigned to display screens in the display wall, and one or more instructions for obtaining the display information for the display screens in the display wall;
      obtain the display information for the display screens based on the one or more instructions, wherein the obtained display information is generated using an image sensor, wherein the obtained display information is arranged in a predefined format and is usable by the display server to discover a layout of the display wall; and
      send one or more messages back to the display server that include the obtained display information for the one or more display screens and the URLs assigned to the display screens.

10. The computer system of claim 9, the one or more processing devices further operable to:
    receive different patterns in the one or more received messages; and
    display the different patterns on the display screens, wherein the obtained display information shows the different patterns displayed on the display screens.

11. The computer system of claim 10, the one or more processing devices further operable to:
    identify webpages in the one or more received messages that contain the different patterns;
    load the webpages on the different display screens; and
    display the different patterns in the webpages.

12. The computer system of claim 9, the one or more processing devices further operable to:
    identify webpages in the one or more received messages that contain the one or more instructions;
    load the webpages on the different display screens; and
    discover the display information in response to executing the one or more instructions in the webpages.

13. The computer system of claim 9, wherein the display information includes information associated with web browsers and operating systems operating on the display screens.

14. The computer system of claim 9, the one or more processing devices further operable to send information that specifies a location of the display wall in at least one of the one or more messages sent back to the display server.

15. A computing device for managing content, the computing device comprising:
    a processor; and
    storage memory storing one or more stored sequences of instructions which, when executed by the processor, cause the processor to:
       receive at least one setup uniform resource locator (URL) from different display walls;
       assign URLs to display screens in the display walls based on the at least one setup URL;

send webpages including different patterns to display on the display screens in the display walls;

discover layouts of the display walls, respectively, based on display information received back following the send the webpages, wherein the display information is generated using an image sensor of a remote device and received over a network, the display information showing the patterns displayed on the display screens;

display the layouts on a user interface;

detect a selection of one of the layouts;

identify a storyboard assigned to one of the display walls associated with the selected one of the layouts; and display webpages and associated content for the identified storyboard.

16. The computing device of claim 15, wherein the one or more stored sequences of instructions further cause the processor to:

display other storyboards matching the selected one of the layouts;

receive a user input selecting one of the other storyboards; and load webpages for the other one of the storyboards into URLs assigned to different display screens in the display wall associated with the selected one of the layouts.

17. The computing device of claim 15, wherein the one or more stored sequences of instructions further cause the processor to:

display location information proximate to the layouts associated with the display walls, wherein the location information specifies locations for the display walls, respectively.

18. The computing device of claim 17, wherein the one or more stored sequences of instructions further cause the processor to:

identify one of the locations correlated with the selected one of the layouts;

identify location data associated with the content for the identified storyboard; and filter the content to display the location data associated with the identified location.

19. The computing device of claim 15, wherein the display screens comprise a heterogeneous group of display screens.

* * * * *